United States Patent
Orlandi

(10) Patent No.: US 10,525,554 B2
(45) Date of Patent: Jan. 7, 2020

(54) WATER COOLING OF LASER COMPONENTS

(71) Applicant: Hypertherm, Inc., Hanover, NH (US)

(72) Inventor: Davide Orlandi, Bologna (IT)

(73) Assignee: Hypertherm, Inc., Hanover, NH (US)

( * ) Notice: Subject to any disclaimer, the term of this patent is extended or adjusted under 35 U.S.C. 154(b) by 257 days.

(21) Appl. No.: 15/339,070

(22) Filed: Oct. 31, 2016

(65) Prior Publication Data

US 2017/0120392 A1  May 4, 2017

Related U.S. Application Data

(60) Provisional application No. 62/248,960, filed on Oct. 30, 2015.

(51) Int. Cl.
*B23K 26/70* (2014.01)
*B23K 26/14* (2014.01)

(52) U.S. Cl.
CPC ........ *B23K 26/703* (2015.10); *B23K 26/1476* (2013.01)

(58) Field of Classification Search
CPC  B23K 26/703; B23K 26/147; B23K 26/1476; B23K 26/1482
USPC ... 219/121.6, 121.73, 121.84, 137.62, 137.9, 219/121.67, 121.68, 121.69, 121.72, 219/121.75, 121.85
See application file for complete search history.

(56) References Cited

U.S. PATENT DOCUMENTS

| | | | | |
|---|---|---|---|---|
| 3,503,804 A | * | 3/1970 | Schneider | B05B 7/228 134/1 |
| 4,031,351 A | | 6/1977 | Martin | |
| 4,125,757 A | * | 11/1978 | Ross | B23K 26/14 219/121.67 |
| 4,324,972 A | * | 4/1982 | Furrer | B23K 26/02 219/121.63 |

(Continued)

FOREIGN PATENT DOCUMENTS

| DE | 3637568 A1 | 5/1998 |
|---|---|---|
| EP | 2875896 A1 | 5/2015 |

(Continued)

OTHER PUBLICATIONS

Amada America Inc., "Amada WACS System", Retrieved from the internet at: http://www.amada.de/en/laser/wacs-system.html, printed Oct. 27, 2016, 2 pages.

*Primary Examiner* — Jimmy Chou
(74) *Attorney, Agent, or Firm* — Proskauer Rose LLP

(57) ABSTRACT

The invention features methods and apparatuses for thermally regulating a laser processing head. A thermal regulation device includes a body shaped to matingly engage a laser processing nozzle and to define a fluid flow boundary of a liquid flow passage between the body and an exterior surface of the laser processing nozzle when the thermal regulation device is affixed to the laser processing nozzle. The thermal regulation device also includes an inlet formed in a first end of the body and configured to provide liquid to the liquid flow passage, the liquid remaining external to an exterior surface of the laser processing nozzle. The thermal regulation device also includes an outlet formed in a second end of the body opposite the first end. The outlet is configured to exhaust liquid from the liquid flow passage.

15 Claims, 2 Drawing Sheets

(56) References Cited

U.S. PATENT DOCUMENTS

| | | | | |
|---|---|---|---|---|
| 4,642,445 | A * | 2/1987 | Stol | B23K 26/12 |
| | | | | 219/121.84 |
| 4,672,171 | A * | 6/1987 | Cusimano | B05B 7/226 |
| | | | | 219/121.48 |
| 4,724,299 | A * | 2/1988 | Hammeke | B05B 7/1486 |
| | | | | 219/121.6 |
| 4,804,815 | A * | 2/1989 | Everett | B05B 7/228 |
| | | | | 219/121.66 |
| 5,043,548 | A * | 8/1991 | Whitney | B05B 7/1486 |
| | | | | 219/121.47 |
| 5,418,350 | A * | 5/1995 | Freneaux | B05B 7/228 |
| | | | | 219/121.64 |
| 5,455,401 | A * | 10/1995 | Dumais | H05H 1/28 |
| | | | | 219/119 |
| 5,578,227 | A * | 11/1996 | Rabinovich | B23K 26/34 |
| | | | | 219/121.63 |
| 5,902,499 | A * | 5/1999 | Richerzhagen | B23K 26/06 |
| | | | | 219/121.67 |
| 6,264,649 | B1 * | 7/2001 | Whitcroft | A61B 18/203 |
| | | | | 604/113 |
| 6,534,745 | B1 * | 3/2003 | Lowney | B23K 26/1482 |
| | | | | 219/121.84 |
| 6,583,383 | B2 * | 6/2003 | Higashi | B23K 26/18 |
| | | | | 219/121.67 |
| 6,696,664 | B2 * | 2/2004 | Pyritz | B23K 26/144 |
| | | | | 219/121.64 |
| 7,605,346 | B2 * | 10/2009 | Harris | B23K 26/34 |
| | | | | 219/121.63 |
| 8,134,098 | B2 * | 3/2012 | Muratsubaki | B23K 26/146 |
| | | | | 219/121.67 |
| 10,016,845 | B2 * | 7/2018 | Richerzhagen | B23K 26/0665 |
| 10,022,820 | B2 * | 7/2018 | Gaebelein | B23K 26/38 |
| 10,092,980 | B1 * | 10/2018 | Gaebelein | B23K 26/1417 |
| 2002/0130115 | A1 * | 9/2002 | Lawson | B23K 26/147 |
| | | | | 219/121.84 |
| 2004/0188397 | A1 * | 9/2004 | Connally | B23K 10/00 |
| | | | | 219/121.67 |
| 2005/0056628 | A1 * | 3/2005 | Hu | B23K 26/144 |
| | | | | 219/121.84 |
| 2005/0133486 | A1 * | 6/2005 | Baker | B23K 26/0096 |
| | | | | 219/121.63 |
| 2007/0193981 | A1 * | 8/2007 | Peng | B23K 26/1476 |
| | | | | 219/121.33 |
| 2007/0278195 | A1 * | 12/2007 | Richerzhagen | B23K 26/0665 |
| | | | | 219/121.69 |
| 2008/0127891 | A1 * | 6/2008 | Dezert | B23K 26/0648 |
| | | | | 118/620 |
| 2008/0308538 | A1 * | 12/2008 | Harris | B23K 26/34 |
| | | | | 219/121.84 |
| 2009/0084765 | A1 * | 4/2009 | Muratsubaki | B23K 26/146 |
| | | | | 219/121.67 |
| 2009/0179012 | A1 * | 7/2009 | Zepf | H01S 3/0401 |
| | | | | 219/121.63 |
| 2009/0314753 | A1 * | 12/2009 | Kosmowski | B23K 26/14 |
| | | | | 219/121.72 |
| 2013/0298387 | A1 * | 11/2013 | Kobier | B23K 26/38 |
| | | | | 29/623.1 |
| 2014/0186549 | A1 * | 7/2014 | Miyagi | B05B 1/24 |
| | | | | 427/554 |

FOREIGN PATENT DOCUMENTS

| | | |
|---|---|---|
| FR | 2217118 A1 | 9/1974 |
| GB | 1437237 A | 5/1976 |
| JP | 63309388 A | 12/1988 |

\* cited by examiner

WATER COOLING OF LASER COMPONENTS

RELATED APPLICATIONS

This application claims the benefit of U.S. Provisional Patent Application No. 62/248,960, which was filed on Oct. 30, 2015 and entitled "Water Cooling of Laser Components." The entire contents of this application are incorporated herein by reference.

FIELD OF THE INVENTION

The invention relates generally to the field of laser cutting systems and processes. More specifically, the invention relates to improved methods and apparatuses for cooling laser components during a cutting operation.

BACKGROUND

Material processing apparatuses, such as laser cutting machines, are widely used in the cutting, welding, and heat treating of materials. A laser-cutting machine generally includes a high-power laser, a nozzle, a gas stream, an optical system, and a computer numeric control (CNC) system. The laser beam and gas stream pass through an orifice of the nozzle and impinge upon a workpiece. The laser beam heats the workpiece, which, in conjunction with any chemical reaction between the gas and workpiece material, alters (e.g., liquefies and/or vaporizes) a selected area of the workpiece, allowing an operator to cut or otherwise modify the workpiece. The laser optics and CNC are used to position the laser beam relative to the workpiece during a cutting operation. Lasers are frequently used in material processing applications because laser beams can be focused to small spot sizes, thereby achieving the intensity and power density desired to process industrial-strength materials such as metals.

Cooling of consumables and other components of laser processing systems can improve life and performance of the system, e.g., of the laser head and the consumables. Some traditional laser nozzles rely on gas cooling systems only. In such nozzles, a gas is passed through passages coaxial to the laser beam and is directed to impinge upon specific nozzle surfaces to remove excess thermal energy, thereby cooling the nozzle, prolonging life and improving cut quality. Other laser processing systems include a complex laser head having a series of passageways for cooling liquids (e.g., water) that are integrated into the laser head and designed to circulate to, against, and through the nozzle during operation. While such a configuration may provide enhanced cooling and performance over other traditional gas-only cooled nozzles, it requires that a great deal of complexity be built into the laser machining head (e.g., formation of liquid passages within the laser machining head and a connection to a liquid supply) and that significant maintenance be performed. Such prior art configurations also reduce the flexibility and versatility of the laser machining head and system itself, potentially requiring that a laser processing machine be set up for either water cooled or gas cooled cutting and requiring that the laser machining head itself (and not just the consumables) be replaced in order to transition between liquid cooled and gas cooled operations. Further, high volume circulation of liquids within the laser processing head and nozzle holder may degrade, oxidize, and shorten the life of these systems and components.

SUMMARY OF THE INVENTION

The current technology provides a system and method by which an operator can quickly and easily transition between gas-cooled and liquid-cooled operation of a laser processing system without needing to switch or swap out the laser machining head. This technology provides optional or removable water cooling to a laser nozzle that is substantially external and separable to the laser processing head itself.

In one aspect, the invention features a thermal regulation device for a laser processing head. The thermal regulation device includes a body shaped to matingly engage a laser processing nozzle and to define a fluid flow boundary of a liquid flow passage between the body and an exterior surface of the laser processing nozzle when the thermal regulation device is affixed to the laser processing nozzle. The thermal regulation device also includes an inlet formed in a first end of the body and configured to provide liquid to the liquid flow passage, the liquid remaining external to an exterior surface of the laser processing nozzle. The thermal regulation device also includes an outlet formed in a second end of the body opposite the first end, the outlet configured to exhaust liquid from the liquid flow passage.

In some embodiments, the liquid remains external to the nozzle holder. In some embodiments, the outlet is configured to direct liquid radially outward from the thermal regulation device. In some embodiments, the outlet is configured to direct liquid coaxially with the laser processing head and the liquid is exhausted to atmosphere about the laser processing nozzle. In some embodiments, the body is shaped to substantially circumferentially enclose the laser processing nozzle. In some embodiments, the thermal regulation device includes a first conduit connected to the inlet and configured to supply liquid to the body and a second conduit connected to the outlet and configured to direct liquid away from the body. In some embodiments, the body of the thermal regulation device has a substantially annular shape. In some embodiments, the thermal regulation device is retro-fittable to the laser processing nozzle. In some embodiments, the thermal regulation device is freely rotatable about the laser processing nozzle. In some embodiments, the thermal regulation devise is reusable. In some embodiments, the thermal regulation device is switchable between gas-cooled and liquid-cooled modes while the laser machining head remains in place during operation. In some embodiments, the thermal regulation device further includes an aluminum or plastic component.

In another aspect, the invention features a thermal dissipation component for a laser processing head. The thermal dissipation component includes a substantially cylindrical core having a longitudinal axis. The substantially cylindrical core defines a circumferential interior surface oriented about the longitudinal axis and/or is shaped to at least partially surround an exterior surface of a laser processing nozzle. The circumferential interior surface and the laser processing nozzle defines a first semicircular liquid flow passage disposed about a first exterior portion of the nozzle and a second semicircular liquid flow passage disposed about a second exterior portion the nozzle. The thermal dissipation component also includes an inlet formed in the core and shaped to provide liquid to the two semicircular liquid flow passages. The two semicircular liquid flow passages are configured to keep liquid external to the laser processing head. The thermal dissipation component also includes an outlet formed in the core and configured to exhaust liquid from the two semicircular liquid flow passages. The thermal dissipation component also includes a first conduit, in fluid communication with the inlet, for supplying liquid to the inlet. The thermal dissipation component also includes a second conduit, in fluid communication with the outlet, for exhausting liquid from the outlet. In some embodiments, the two semicircular liquid flow passages are fluidly connected to a flow path in the torch head.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
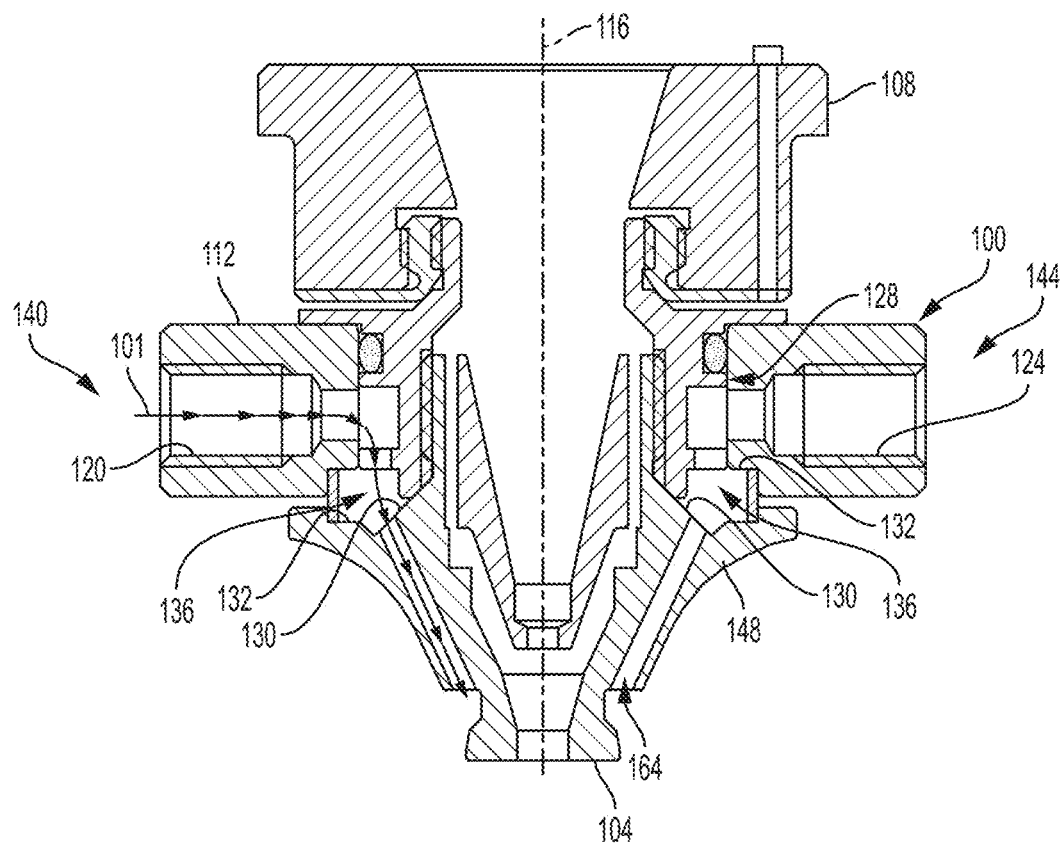
FIG. 1 is a cross-sectional illustration of a thermal regulation device disposed about a laser nozzle in a nozzle holder, according to an illustrative embodiment of the invention.

FIG. 1 is a cross-sectional illustration of a thermal regulation device 100 (e.g., a thermal dissipation component) disposed about a laser nozzle 104 in a nozzle holder 108, according to an illustrative embodiment of the invention. The thermal regulation device 100 includes a body 112 (e.g., a substantially cylindrical core) having a longitudinal axis 116, a first device orifice 120 (e.g., here an inlet), and a second device orifice 124 (e.g., here an outlet). The inlet 120 is formed in a first end 140 of the body 112 and is configured to provide liquid to a liquid flow passage 136 (e.g., an annular region whose cross-section is depicted). The outlet 124 formed in a second end 144 of the body 112 opposite the first end 140 and is configured to exhaust liquid from the liquid flow passage 136.

The body 112 includes a mating surface 128 (e.g., a circumferential interior surface oriented about the longitudinal axis 116), which is shaped to matingly engage the laser processing nozzle 104 (e.g., shaped to at least partially surround an exterior surface 130 of the laser processing nozzle 104). The body 112 defines a fluid flow boundary 132 of a liquid flow passage 136 (e.g., two semicircular liquid flow passages disposed about the nozzle 104) that exists between the body 112 and the exterior surface 130 of the laser processing nozzle 104 when the thermal regulation device 100 is affixed to the laser processing nozzle 104. In some embodiments, the thermal regulation device 100 has an annular shape, which allows the thermal regulation device 100 to be disposed about (e.g., connected to and/or at least partially surrounding) the laser nozzle 104.

During a cutting operation, liquid (e.g., water) is supplied to the thermal regulation device 100, e.g., via a first conduit in fluid communication with the inlet 120, as shown and described below in FIG. 2. The liquid flows along the flow path 101, in through the inlet 120 and into interior portions of the laser nozzle 104 including the liquid flow passage 136 without requiring any changes or adjustments to the nozzle holder 108. During this process, liquid flows into the liquid flow passage 136 and about the exterior surface 130 of the laser nozzle 104. Heat can be transferred to the liquid from the laser nozzle 104, thereby cooling the laser nozzle 104. In some embodiments, at least a portion of the liquid flows circumferentially around the nozzle 104 in the annular region 136 (e.g., in two semicircular paths around the nozzle 104 into and out of the plane of the page) and into the outlet 124. Fluid entering the outlet 124 then leaves the thermal regulation device 100, e.g., via a second conduit in fluid communication with the outlet 124, as shown and described below in FIG. 2. This configuration allows the liquid to remain external to the nozzle holder 108 and/or the laser processing head. Numerous benefits are made possible from this approach, including minimizing risk of oxidation or degradation of the laser processing head, reducing the complexity of the laser processing head, and increasing the flexibility and versatility of the laser processing system (e.g., by enabling quick removal or installation of the thermal regulation device 100 to transition between liquid cooled and gas cooled operation).

In some embodiments, the nozzle 104 includes a forward section 148. The forward section 148 can include a fluid passageway 164. During a cutting operation, a portion of the liquid may travel through the fluid passageway 164 and exhaust proximate the nozzle bore 168, as shown. Such a configuration may help reduce the heat in the nozzle and help cool the nozzle proximate the tip. In such embodiments, the liquid flow entering the system through the inlet 120 can equal the sum of the liquid flow leaving through the outlet 124 and the liquid flow exhausting through liquid passageway 164 proximate the nozzle bore 168. In some embodiments, both the first device orifice 120 and the second device orifice 124 are inlets, in which case all liquid can leave through the liquid passageway 164.

In some embodiments, the body 112 is shaped to substantially circumferentially enclose the laser processing nozzle 104. In some embodiments, the forward section 148 of the nozzle 104 is also shaped to substantially circumferentially enclose the laser processing nozzle 104. In some embodiments, the thermal regulation device 100 is retro-fittable to the laser processing nozzle 104. In some embodiments, the thermal regulation device 100 is freely rotatable about the laser processing nozzle 104. In some embodiments, the thermal regulation device 100 is reusable, e.g., can be used during many successive cutting operations before requiring replacement. In some embodiments, the thermal regulation device 100 is switchable between gas-cooled and liquid-cooled modes while the laser processing head remains in place during operation. In some embodiments, the thermal regulation device 100 includes an aluminum or plastic component (e.g., the body 112). In some embodiments, the outlet 124 is configured to direct liquid radially outward from the thermal regulation device 100. In some embodiments, the outlet 124 is configured to direct liquid coaxially with the laser processing head above the holder, and the liquid is exhausted to atmosphere about the laser processing nozzle 104. In some embodiments, the thermal regulation device 100 is interchangeable or usable with different nozzles, e.g., either the same or different nozzle models.

Figure 2:
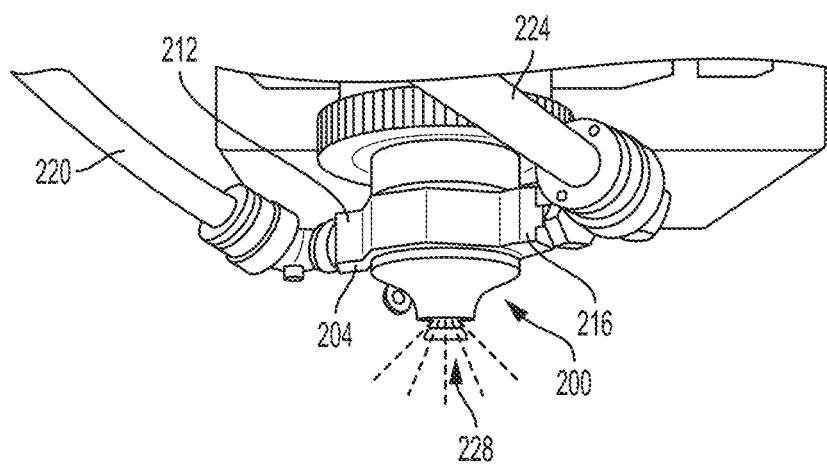
FIG. 2 is an exterior illustration of a thermal regulation device for a laser processing head during operation, according to an illustrative embodiment of the invention.

FIG. 2 is an exterior illustration of a thermal regulation device 200 (e.g., a thermal dissipation component) for a laser processing head during operation, according to an illustrative embodiment of the invention. As in FIG. 1, the thermal regulation device 200 includes a body 204, an inlet 212 formed in the body 204, and an outlet 216 formed in the body 204 on an opposite side from the inlet 212. As shown, a first conduit 220 is fluidly connected to the inlet 212 and is configured to supply liquid to the body of the thermal regulation device 200. In addition, a second conduit 224 is fluidly connected to the outlet 216 and is configured to direct liquid away from the body 204. During operation, the first conduit 220 supplies liquid to the thermal regulation device 200. The annular shape of the thermal regulation device 200 helps liquid flow around the nozzle 228, e.g., in two semi-circles. Liquid is then directed to the outlet 216, which exhausts heated liquid through the second conduit 224. In this configuration, the liquid remains external to the nozzle holder 228 and the laser processing head 204 during operation.

As shown, this configuration removes a great deal of complexity from the nozzle holder and laser processing head 204 as compared with the prior art, allowing liquid to be supplied via a number of sources. In this configuration, the thermal regulation device 200 may be installed quickly about the laser processing nozzle and directly supply liquid to the laser processing nozzle and the workpiece (not shown) via passages formed in the chamber and laser processing nozzle. In this configuration, the laser processing nozzle is connected to (e.g., mounted to) the laser processing head.

Figure 3:
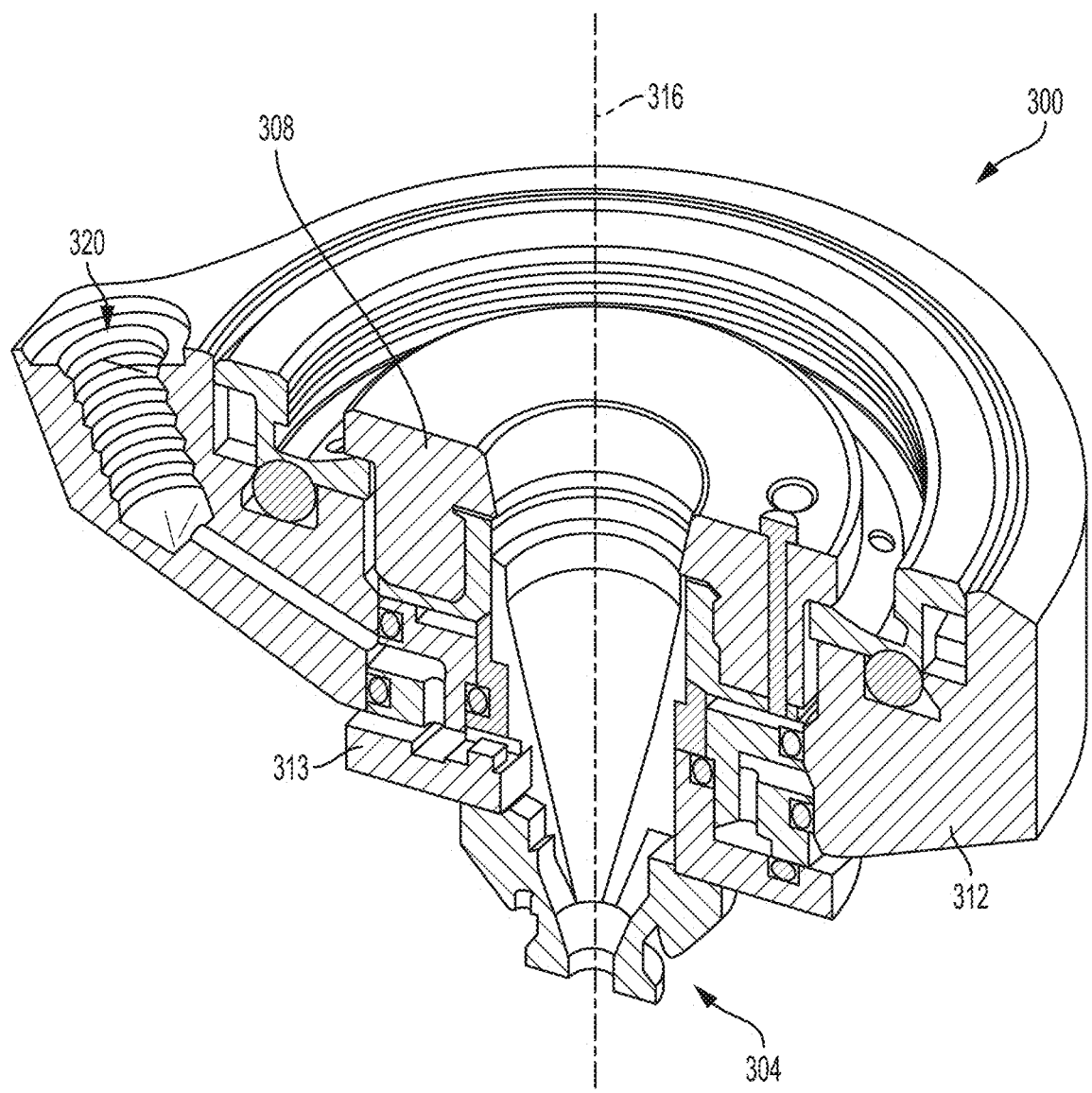
FIG. 3 is a sectioned perspective illustration of a thermal regulation device disposed about a laser nozzle in a nozzle holder, according to another illustrative embodiment of the invention.

FIG. 3 is a sectioned perspective illustration of a thermal regulation device 300 (e.g., a thermal dissipation component) disposed about a laser nozzle 304 in a nozzle holder 308, according to another illustrative embodiment of the invention. As in FIGS. 1 and 2, the thermal regulation device 300 includes a body 312 defining a first orifice (e.g., an inlet) 320 formed in the body 312 and a second orifice (e.g., an outlet). The outlet, which is not depicted in FIG. 3 due to sectioning, can be arranged at an angle from the inlet 320 about a longitudinal axis 316 of the thermal regulation device 300. In some embodiments, such as the example of FIG. 3, the outlet can be disposed at an angle of about 45 degrees to about 135 degrees (e.g., about 90 degrees) from the inlet 320 about the longitudinal axis 316. In some embodiments, the outlet can be formed on an opposite side from the inlet 212.

As with other embodiments and as described above, a first conduit can be fluidly connected to the inlet 320 and configured to supply liquid to the body of the thermal regulation device 300. In addition, a second conduit can be fluidly connected to the outlet and configured to direct liquid away from the body 312. During operation, the first conduit can supply liquid to the thermal regulation device 300. The annular shape of the thermal regulation device 300 helps liquid flow around the nozzle 304, for example, along partially circular flow paths. Liquid can then be directed to the outlet, which exhausts heated liquid through the second conduit. In this configuration, the liquid typically remains external to the nozzle holder 308 during operation.

In some embodiments, the nozzle 304 can be a separate and distinct component disposed within a plastic insulator 313. The nozzle 304 can be substantially centered within the nozzle holder 308. Additionally, in some embodiments, the body 312 can be an insulating component, which can be formed by a non-conductive material, such as Delrin. The body 312 can also include a mating surface to accommodate or interface with the nozzle. An advantage of some of the embodiments discussed herein, such as those depicted in FIG. 3, is that axial alignment of the body 312 can be set by the nozzle holder 308 rather than the upper nut. Such alignment methods can help to reduce or limit coolant leaks through seals (e.g., o-rings) on the nozzle.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A thermal regulation device configured to engage a laser cutting head having a separable laser cutting nozzle, the thermal regulation device comprising:
   a body shaped to matingly engage a separable laser cutting nozzle that directly confines a laser beam and to define a fluid flow boundary of a liquid flow passage between an exterior surface of an interior circumference of the body and an exterior surface of the laser cutting nozzle when the thermal regulation device is affixed to the laser cutting nozzle, the body shaped to substantially circumferentially enclose a central portion of the laser processing nozzle;
   an inlet formed in a first end of the body and configured to provide liquid to the liquid flow passage, the liquid flow passage configured to keep the liquid remaining external to an exterior surface of the laser cutting nozzle; and
   an outlet formed in a second end of the body opposite the first end, the outlet configured to exhaust liquid from the liquid flow passage.

2. The thermal regulation device of claim 1 wherein the liquid remains external to a holder of the laser cutting nozzle.

3. The thermal regulation device of claim 1 wherein the outlet is configured to direct liquid radially outward from the thermal regulation device.

4. The thermal regulation device of claim 1 wherein the outlet is configured to direct liquid coaxially with the laser cutting head and the liquid is exhausted to atmosphere about the laser cutting nozzle.

5. The thermal regulation device of claim 1 wherein the body is shaped to substantially circumferentially enclose the laser cutting nozzle.

6. The thermal regulation device of claim 1 further comprising a first conduit connected to the inlet and configured to supply liquid to the body and a second conduit connected to the outlet and configured to direct liquid away from the body.

7. The thermal regulation device of claim 1 wherein the body has a substantially annular shape.

8. The thermal regulation device of claim 1 wherein the thermal regulation device is retro-fittable to the laser cutting nozzle.

9. The thermal regulation device of claim 1 wherein the thermal regulation device is freely rotatable about the laser cutting nozzle.

10. The thermal regulation device of claim 1 wherein the thermal regulation devise is reusable.

11. The thermal regulation device of claim 1 wherein the thermal regulation device is switchable between gas-cooled and liquid-cooled modes while the laser machining head remains in place during operation.

12. The thermal regulation device of claim 1 further comprising an aluminum or plastic component.

13. The thermal regulation device of claim 1 further including a second liquid flow passage in fluid communication with the liquid flow passage, the second liquid flow passage configured to exhaust fluid proximate a bore of the laser cutting nozzle.

14. The thermal regulation device of claim 1 wherein the liquid flow passage does not intersect with the laser beam.

15. The thermal regulation device of claim 1 wherein the thermal regulation device is unitary.

* * * * *